(12) United States Patent
Kim

(10) Patent No.: US 6,814,450 B2
(45) Date of Patent: Nov. 9, 2004

(54) PROJECTION SYSTEM EMPLOYING TWO LIGHT SOURCES OR TWO LIGHT VALVES

(75) Inventor: Tae-hee Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/620,810

(22) Filed: Jul. 17, 2003

(65) Prior Publication Data

US 2004/0046946 A1 Mar. 11, 2004

(30) Foreign Application Priority Data

Aug. 29, 2002 (KR) .................................. 10-2002-0051489

(51) Int. Cl.[7] .............................................. G03B 21/14
(52) U.S. Cl. .............................. 353/94; 353/30; 353/31; 353/101
(58) Field of Search ........................ 353/30, 31, 33, 353/34, 37, 94, 84, 101; 349/5, 7, 8, 9; 348/742, 743, 771

(56) References Cited

U.S. PATENT DOCUMENTS

| | | | |
|---|---|---|---|
| 5,829,856 A | * | 11/1998 | Perlo et al. ................... 353/84 |
| 6,147,720 A | | 11/2000 | Guerinot et al. |
| 6,224,217 B1 | * | 5/2001 | Tanaka ........................ 353/94 |
| 6,585,380 B2 | * | 7/2003 | Yamamoto ................... 353/98 |
| 6,591,022 B2 | * | 7/2003 | Dewald ...................... 382/274 |
| 6,642,969 B2 | * | 11/2003 | Tew ........................... 348/743 |
| 2003/0007134 A1 | * | 1/2003 | Maximus .................... 353/31 |
| 2003/0063261 A1 | * | 4/2003 | Li ............................... 353/20 |
| 2003/0197837 A1 | * | 10/2003 | Gyu Lee ..................... 353/84 |

* cited by examiner

Primary Examiner—William C. Dowling
(74) Attorney, Agent, or Firm—Staas & Halsey LLP

(57) ABSTRACT

A projection system includes first and second light sources, separated by a predetermined distance from each other and radiating a single white light in parallel and in the same direction, first and second spiral lens discs including cylindrical lens cells separating the single white light incident from the first and second light sources into a multi white light by converting a rotational motion of the cylindrical lens cells into a rectilinear movement, and first and second spectroscopes separating the multi white light incident from the first and second spiral lens discs into color light beams having different wavelength bands. First and second light valves modulate the color light beams incident from the first and second spectroscopes according to an image signal to form an image. First and second projection lenses project the color light beams modulated by the first and second light valves onto a screen to display the image.

44 Claims, 7 Drawing Sheets

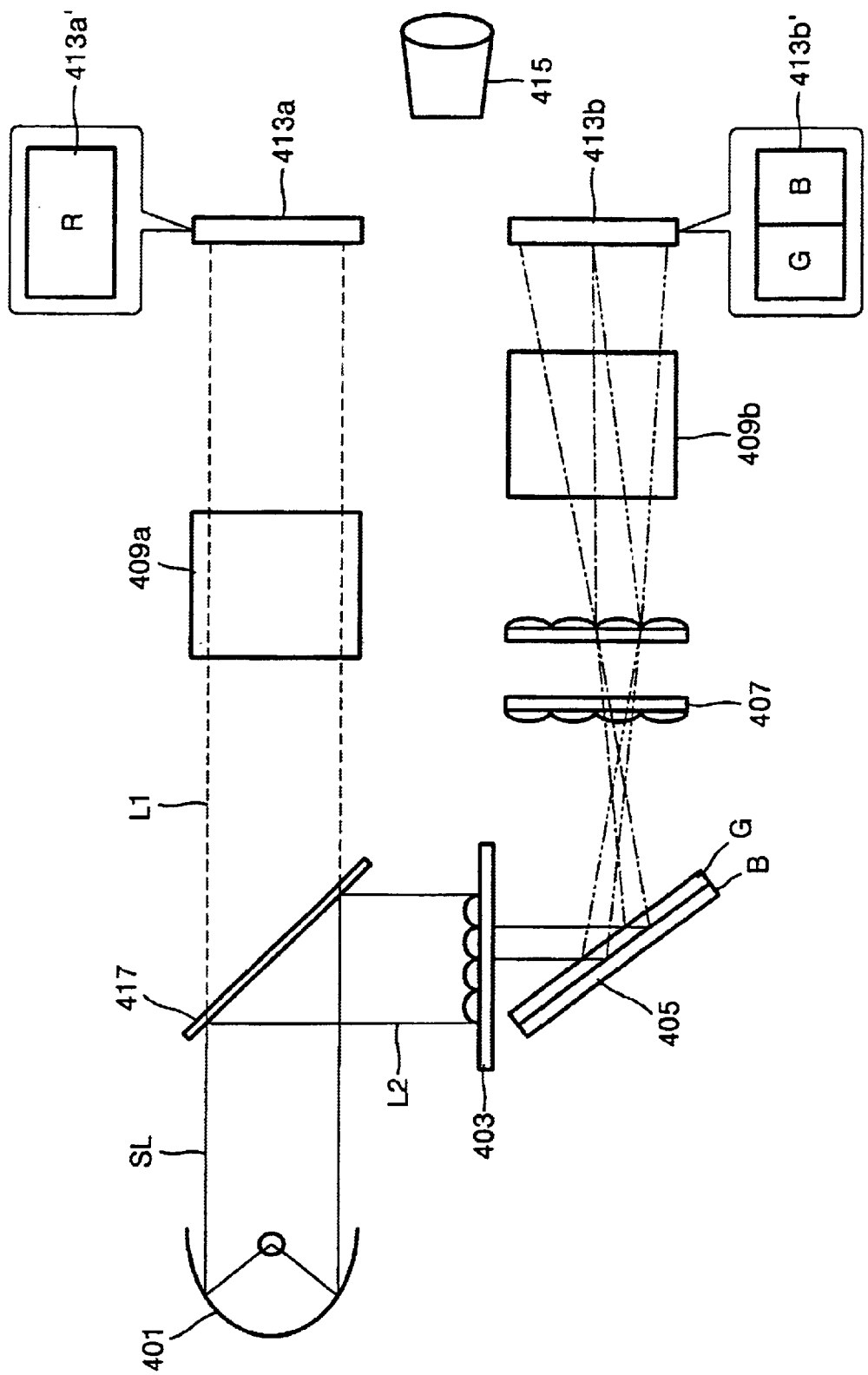

PROJECTION SYSTEM EMPLOYING TWO LIGHT SOURCES OR TWO LIGHT VALVES

CROSS-REFERENCE TO RELATED APPLICATIONS

This application claims the priority of Korean Patent Application No. 2002-51489, filed on Aug. 29, 2002, which is incorporated herein in its entirety by reference.

BACKGROUND OF THE INVENTION

1. Field of the Invention

The present invention relates to a projection system, and more particularly, to a projection system employing a scrolling system including two light sources and two light valves.

2. Description of the Related Art

Projection systems are divided into a single-plate type and a tri-plate type depending on a number of light valves. The light valves perform an on/off control of a light emitted from a high-power lamp light source in units of pixels in order to form an image. The single-plate type projection systems render an optical system smaller than the tri-plate type projection systems. However, because the single-plate type projection systems divide white light into red, green, and blue (RGB) light beams using a sequential method, a corresponding optical efficiency is only ⅓ of the optical efficiency of the tri-plate type projection systems. Accordingly, in order to increase the optical efficiency of single-plate type projection systems, approaches for increasing the number light sources have been suggested, such as the one disclosed in U.S. Pat. No. 6,147,720, which describes to a projection system employing two lamps and a single light valve, as shown in FIG. 1.

Referring to FIG. 1, the conventional projection system 10 includes two lamps L1 and L2, which are oriented at 90 degrees to each other, and a filter wheel W, which is oriented at 45 degrees. The two lamps L1 and L2 direct converging input light beams IB1 and IB2, respectively, to a focus at a common spot 12 at one side of the filter wheel W.

Each of the lamps L1 and L2 includes a bulb 14, a reflector 16, and a focusing lens 18. A beam annular portion 20 of the filter wheel W is alternatively used for transmission of the light from the lamp L1 and of a reflection of the input light from the lamp L2 to form a multiplexed light beam MB illuminating a light valve LV. The light valve LV modulates the multiplexed light. beam MB to travel toward a projection lens 24. The projection lens 24 projects the modulated beam onto a screen 26 to form the image.

A video signal is received at a light valve control circuit 28 and applied to the light valve LV via a line 30. A hub motor control circuit 32 controls a rotational speed and a phase of a hub motor 22 installed at the filter wheel W in response to the video signal applied thereto via a line 34 from the light valve control circuit 28. The lamps L1 and L2 are alternately energized from a lamp power supply 36 via lines 40 and 38, respectively. A line 42 is provided via which a signal is provided from the light valve control circuit 28 to the lamp power supply 36. A connection line 44 is provided between the lamp power supply 36 and the hub motor control circuit 42.

This conventional projection system employs two lamps L1 and L2 in order to improve light emission efficiency. However, because the filter wheel W partially transmits the light, the light emission efficiency is not notably improved. Moreover, the conventional projection system is disadvantageous in that it is difficult to achieve a color balance and a wide color gamut

SUMMARY OF THE INVENTION

The present invention provides a projection system improving a light emission efficiency and a color balance of a display and expanding a color gamut.

Additional aspects and/or and advantages of the invention will be set forth in part in the description which follows, and, in part, will be obvious from the description, or may be learned by practice of the invention.

According to an aspect of the present invention, there is provided a projection system to display an image on a screen, including first and second light sources, separated by a predetermined distance from each other and radiating a single white light in parallel and in the same direction; first and second spiral lens discs including cylindrical lens cells arranged in a spiral shape and separating the single white light incident from the first and second light sources into a multi white light by converting a rotational motion of the cylindrical lens cells into a rectilinear movement of a cylindrical lens array; first and second spectroscopes separating the multi white light incident from the first and second spiral lens discs into color light beams having different wavelength bands; first and second light valves modulating the color light beams incident from the first and second spectroscopes according to an image signal to form the image; and first and second projection lenses projecting the color light beams modulated by the first and second light valves onto the screen to display the image.

According to an aspect of the present invention, the projection system further includes a first fly-eye lens on a first optical path between the first spectroscope and the first light valve; a second fly-eye lens on a second optical path between the second spectroscope and the second light valve, a first relay lens on a third optical path between the first fly-eye lens and the first light valve; and a second relay lens on a fourth optical path between the second fly-eye lens and the second light valve, wherein the first and second relay lenses focus the incident light onto the first and second light valves, respectively.

According to an aspect of the present invention, the projection system further includes a first beam splitter disposed on a fifth optical path between the first relay lens and the first light valve, transmitting the light incident from the first relay lens to the first light valve, and reflecting the light incident from the first light valve to the first projection lens; and a second beam splitter disposed on a sixth optical path between the second relay lens and the second light valve, transmitting the light incident from the second relay lens to the second light valve, and reflecting the light incident from the second light valve to the second projection lens.

According to an aspect of the present invention, the first and second spectroscopes are dichroic filter arrays separating the incident light into the color light beams, and at least one of the dichroic filter arrays comprises dichroic filters to separate the incident light into red, green, and blue light beams or dichroic filters to separate the incident light into yellow, cyan, and magenta light beams.

According to an aspect of the present invention, a color bar in which three colors are included three segments, is formed on each of the first and second light valves.

According to another aspect of the present invention, there is provided a projection system to display an image on a screen, including first and second light sources separated by a predetermined distance from each other and radiating a single white light in parallel and in opposite directions facing each other; first and second spiral lens discs including cylindrical lens cells arranged in a spiral shape and separating the single white light b b from the first and second light sources into a multi light by converting a rotational motion of the cylindrical lens cells into a rectilinear movement of a cylindrical lens array; first and second spectroscopes separating the multi white light incident from the first and second spiral lens discs into color light beams having different wavelengths; a light valve modulating the color light beams incident from the first and second spectroscopes according to an image signal to form the image; and a projection lens, projecting the color light beams modulated by the light valve onto the screen to display the image.

According to an aspect of the present invention, the projection system further includes a first fly-eye lens on a first optical path between the first spectroscope and the light valve; and a second fly-eye lens on a second optical path between the second spectroscope and the light valve.

According to an aspect of the present invention, the projection system further includes a first relay lens on a third optical path between the first fly-eye lens and the light valve; and a second relay lens on a fourth optical path between-the second fly-eye lens and the fight valve, wherein the first and second relay lenses focus the incident light onto the light valve.

According to an aspect of the present invention, the projection system further includes a first beam splitter disposed on a fifth optical path between the first relay lens and the light valve, transmitting the light incident from the first relay lens to the light valve, and reflecting the light incident from the light valve to the projection lens; and a second beam splitter, disposed on a sixth optical path between the second relay lens and the light valve, transmitting the light incident from the second relay lens to the light valve, and reflecting the light incident from the light valve to the projection lens.

According to an aspect of the present invention, the first and second spectroscopes are dichroic filter arrays, to separate the incident light into the color light beams, and at least one of the dichroic filter arrays includes a dichroic filter to separate the incident light into red, green, and blue light beams or dichroic filters to separate the incident light into yellow, cyan, and magenta light beams.

According to an aspect of the present invention, a color bar in which three colors are expressed in three segments, is formed on the light valve.

According to still another aspect of the present invention, there is provided a projection system to display an image on a screen, including a light source radiating a single white light; a spiral lens disc including cylindrical lens cells arranged in a spiral shape and separating the single white light incident from the light source into a multi light by converting a rotational motion of the cylindrical lens cells into a rectilinear movement of a cylindrical lens array; a spectroscope separating the multi light incident from the spiral lens disc into color light beams having different wavelengths; a color splitting filter splitting the color light beams incident from the spiral lens disc into two optical paths depending on wavelengths; first and second light valves modulating the color light beams, incident via two optical paths, according to an image signal to form the image; and a projection lens projecting the color light beams modulated by the first and second light valves onto the screen to display the image.

Here, the projection system further includes a fly-eye lens on a first optical path between the spectroscope and the color splitting filter.

According to an aspect of the present invention, the projection system further includes a relay lens on a second optical path between the fly-eye lens and the color splitting filter to focus the incident light onto the light valve.

According to an aspect of the present invention, the spectroscope is a dichroic filter array to separate the incident light into the color light beams, and the dichroic filter array includes dichroic filters to separate the incident light into the color light beams According to an aspect of the present invention, a color bar, in which one color is one segment, is formed on the first light valve, and a color bar, in which two colors are two segments, respectively, is formed on the second light valve.

According to still another aspect of the present invention, there is provided a projection system to display an image on a screen, including a light source radiating a single white light; a color splitting filter splitting the single white light incident from the light source into two optical paths depending on wavelength bands; a spiral lens disc disposed on one of the two optical paths, and including cylindrical lens cells arranged in a spiral shape, and separating the light incident from the color splitting filter into a multi light by converting a rotational motion of the cylindrical lens cells into a rectilinear movement of a cylindrical lens array; a spectroscope separating the multi light incident from the spiral lens disc into color light beams having different wavelengths; first and second light valves modulating the light, incident via two optical paths, according to an image signal in order to form the image; and a projection lens, projecting the color light beams modulated by the first and second light valves onto the screen to display the image.

According to an aspect of the present invention, the projection system further includes a fly-eye lens on a first optical path between the spectroscope and the second light valve.

According to an aspect of the present invention, the projection system further includes a relay lens on a second optical path between the color splitting filter and the light valve to focus the light on the light valve.

According to an aspect of the present invention, the spectroscope is a dichroic filter array to separate the incident light into the color light beams, and the dichroic filter array to separate the incident light into the color light beams.

According to an aspect of the present invention, a color bar, in which one color is one segment, is formed on the first light valve, and a color bar, in which two colors are two segments, respectively, is formed on the second light valve.

Additional aspects and/or advantages of the invention will be set forth in part in the description which follows and, in part, will be obvious from the description; or may be learned by practice of the invention.

BRIEF DESCRIPTION OF THE DRAWINGS

These and/or other aspects and advantages of the invention will become apparent and more readily appreciated from the following description of the preferred embodiments; taken in conjunction with the accompanying drawings of which:

FIG. 5 is a diagram of the projection system, according to a fourth aspect of the present invention;

DETAILED DESCRIPTION OF THE PREFERRED EMBODIMENTS

Figure 1:
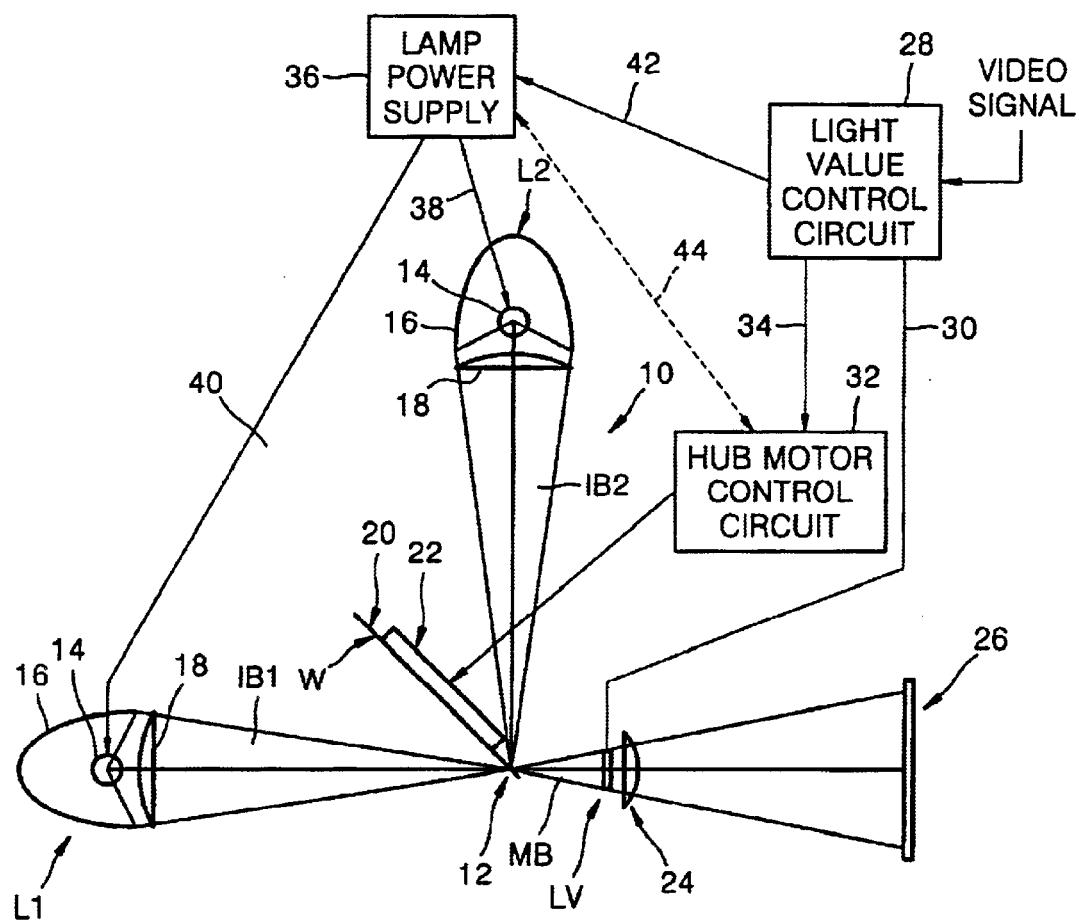
FIG. 1 is a diagram of a conventional projection system employing a single light source and a single light valve.

Reference will now be made in detail to the present aspects of the present invention, examples of which are illustrated in the accompanying drawings, wherein like reference numerals refer to the like elements throughout. The aspects are described below in order, to explain the present invention by referring to the figures. For clarity of the description, an optical path along which light modulated by a light valve that passes through a projection lens and proceeds to a screen is omitted in the drawings.

Figure 2:
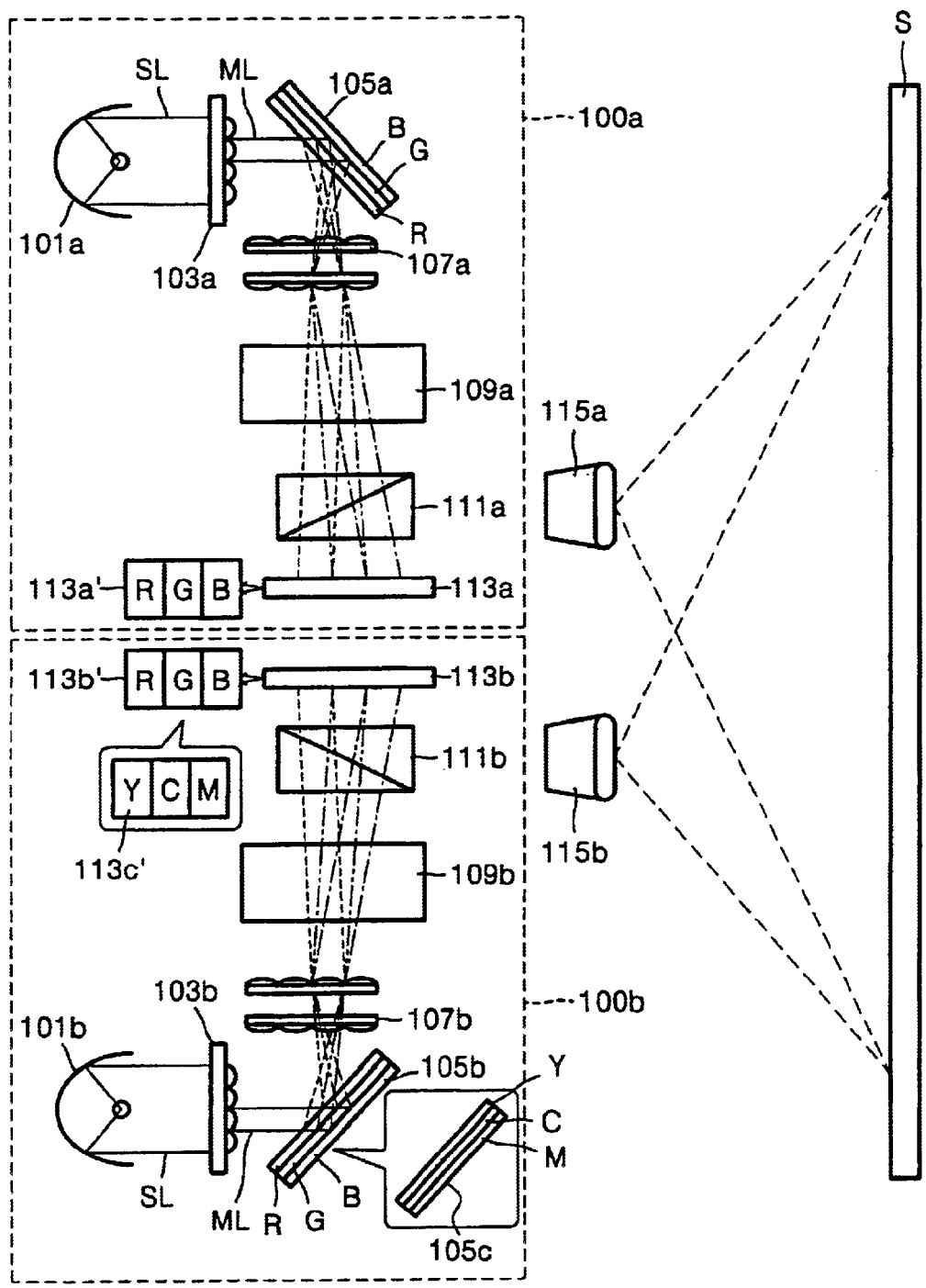
FIG. 2 is a diagram of a projection system, according to a first aspect of the present invention.

FIG. 2 is a diagram of a projection system, according to a first aspect of the present invention. Referring to FIG. 2, first and second illumination optical systems 100a and 100b are disposed in a mirror symmetry to form, an image on a single screen. The first and second illumination optical systems 100a and 100b, respectively, include first and second light sources 101a and 101b, first and second spiral lens discs 103a and 103b, first and second dichroic filter arrays 105a and 105b, first and second fly-eye lenses 107a and 107b, first and second relay lenses 109a and 109b, first and second beam splitters 111a and 111b, and first and second light valves 113a and 113b.

The first and second light sources 101a and 101b radiate a single white light SL in the same direction in parallel. The single white light SL radiated from the first and second light sources 101a and 101b is subject to spectrometry in the first and second spiral lens discs 103a and 103b, and, thus, a multi light ML is output. The multi light ML is divided into a plurality of color light beams by the first and second dichroic filter arrays 105a and 105b. The color light beams are incident on the first and second fly-eye lenses 107a and 107b. The color light beams pass through the first and second fly-eye lenses 107a and 107b, and then pass through the first and second relay lenses 109a and 109b. The color light beams are incident on the first and second light valves 113a and 113b. In the first and second light valves 113a and 113b, the color light beams are modulated in accordance with an electrical image signal. The modulated color light beams are reflected by the first and second beam splitters 111a and 111b, then pass through projection lenses 115a and 115b, and then reach a screen S.

Projection systems, according to first through fourth aspects of the present invention, employ two or less light sources and light valves in a scrolling illumination optical system employing a spiral lens disc. The spiral lens disc is disclosed in Korean Patent Application No. 2003-21415, assigned to Samsung Electronics Co. and incorporated herein by reference FIGS. 6A and 6B are a plane view and a cross-section of the spiral lens disc employed in the projection systems, according to the first through fourth aspects of the present invention, and FIG. 6C is a diagram illustrating design conditions for the spiral lens disc shown in FIGS. 6A and 6 B.

Figure 6A:
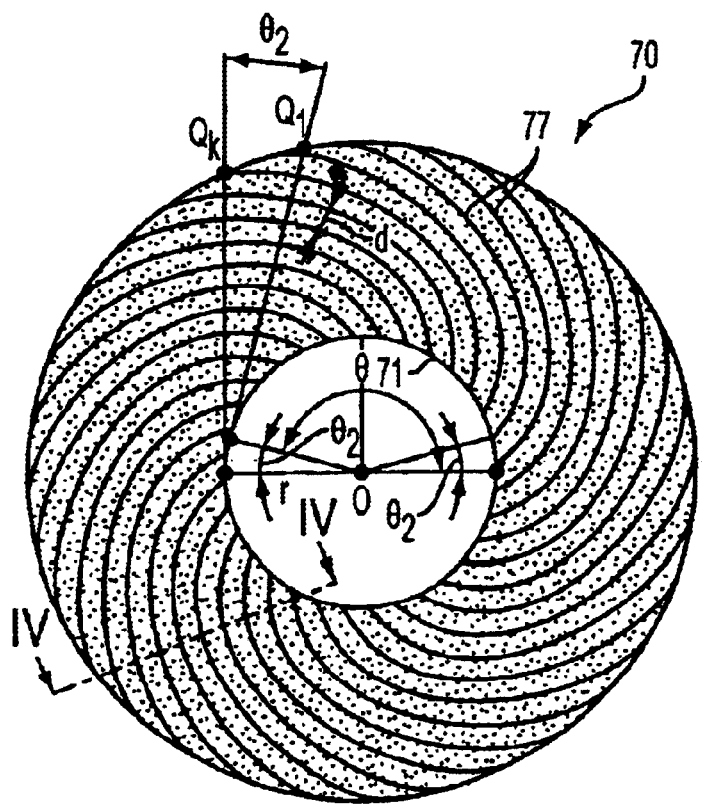
FIG. 6A is a schematic plane view of a spiral lens disc employed in the projection systems, according to the first through fourth aspects of the present invention.
Figure 6B:
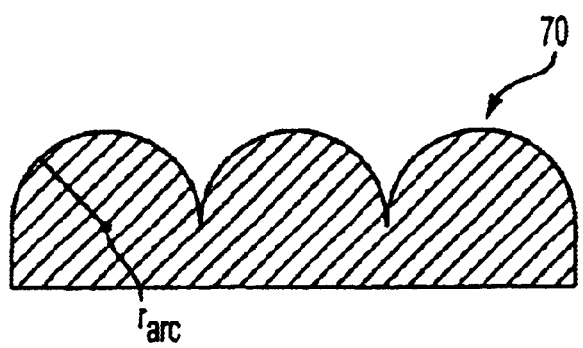
FIG. 6B is a schematic cross-section of the spiral lens disc shown in FIG. 6A.
Figure 6C:
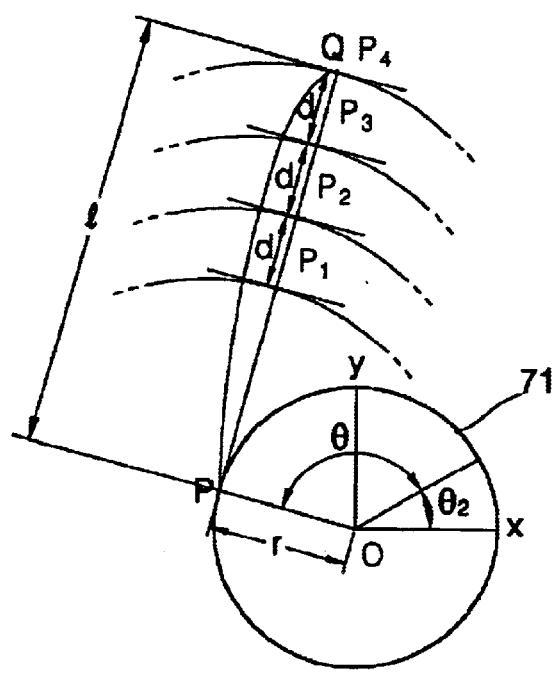
FIG. 6C is a diagram illustrating design conditions for the spiral lens disc shown in FIG. 6A.

Referring to FIG. 6A, in a spiral lens disc 70, cylindrical lens cells 77 are arranged in a spiral shape. As shown in FIG. 6B, a cross-section of the spiral lens disc 70 has the structure of a cylindrical lens array including uniform circular arcs having a radius of a curvature $r_{arc}$. The spiral lens disc 70 is fabricated to have a spiral shape using an involute function, which is usually used to design gears. The involute function may be defined as a track of an end of a thread unwound from a reel. More specifically, as shown in FIG. 6C, a tangent line is drawn from an arbitrary contact P of a central circle 71 of the spiral lens disc 70 to an arbitrary point Q and is defined as a segment. The segment is equally divided to define virtual points $P_1$, $P_2$, $P_3$, or $P_4$. When it is assumed that each virtual point $P_1$, $P_2$, $P_3$, or $P_4$ is an end of thread unwounded from the same reel by a predetermined length, Formula (1) is obtained:

$l = r * \theta$ $$\overrightarrow{OP} = r(\cos\theta, \sin\theta) \tag{1}$$

Here, r denotes the radius of the central circle 71, l denotes the length of the segment $\overrightarrow{PQ}$, θ denotes an angle at which the thread having the length l is wound on the central circle 71, and $\overrightarrow{OP}$ denotes a vector from an origin O to the point P. $\overrightarrow{PQ}$ is a vector from the point P in a tangential direction, so $\overrightarrow{PQ}$ denotes a tangential vector of the vector $\overrightarrow{OP}$ and has a magnitude of l. Accordingly, the vector $\overrightarrow{PQ}$ can be expressed as Formula (2).

$$\overrightarrow{PQ} = l(\sin\theta, -\cos\theta) = r\theta(\sin\theta, -\cos\theta) \tag{2}$$

Based on Formulas (1) and (2), $\overrightarrow{OQ}$ can be expressed as Formula (3)

$$\overrightarrow{OQ} = \overrightarrow{OP} + \overrightarrow{PQ} = (r\cos\theta + r\theta\sin\theta, r\sin\theta - r\theta\cos\theta) \tag{3}$$

Next, when $\vec{Q}'$ denotes the tangential vector of the vector $\overrightarrow{PQ}$ and has the magnitude of l, $\vec{Q}'$ is expressed as Formula (4).

$$\vec{Q}' = l(\cos\theta, \sin\theta) = r\theta(\cos\theta, \sin\theta) \tag{4}$$

Because the same contact P of the central circle 71 and the same r and θ are applied to vectors $\overrightarrow{PP_1}$, $\overrightarrow{PP_3}$, and $\overrightarrow{PP_4}$ with respect to the virtual points $P_1$, $P_2$, $P_3$, or $P_4$, the same tangential vector $\vec{Q}'$ is obtained with respect to the virtual points $P_1$, $P_2$, $P_3$, or $P_4$ according to Formula (4).

In addition, as for adjacent spiral curves $Q_1$ and $Q_k$, one spiral curve can be considered as rotating by a predetermined angle of rotation $\theta_2$ around an origin from the other spiral curve. When it is assumed that the spiral lens disc 70 is divided into n cells, the angle of rotation $\theta_2$ between two adjacent curves can be expressed as Formula (5).

$$\theta_2 = \frac{2\pi}{n} \quad (5)$$

According to Formula (1), the magnitude l of the vector $\vec{PQ}$ is proportional to the angle θ. Thus, a distance d between two adjacent virtual points among the virtual points $P_1$, $P_2$, $P_3$, and $P_4$ is also proportional to the predetermined angle $\theta_2$. Two adjacent virtual points among the virtual points $P_1$, $P_2$, $P_3$, and $P_4$ may be on two adjacent spiral curves, respectively. Accordingly, the distance d between two adjacent virtual points can be defined as a minimum distance between the two adjacent spiral curves $Q_1$ and $Q_k$ and can be expressed as Formula (6)

$$d = r * \theta_2 = r * \frac{2\pi}{n} \quad (6)$$

Referring to Formula (6); because n and r are fixed, the minimum distance d between two adjacent spiral curves is also fixed. In the meantime, when a first spiral curve, i.e., $Q_1$, is rotated by an angle of $(k-1) * \theta_2$, it forms a k-th spiral curve, i.e., $Q_k$. Accordingly, the coordinate value of the k-th spiral curve $Q_k$ can be given by Formula (7).

$$Q_k = Rot((k-1) * \theta_2) * Q = Rot\left(\frac{2\pi(k-1)}{n}\right) * Q \quad (7)$$

Here, Rot denotes a rotation unit vector by which a point is rotated by a certain angle. Formula (7) can be expressed as a determinant of Formula (8).

$$\begin{pmatrix} Q_{k,x} \\ Q_{k,y} \end{pmatrix} = \begin{pmatrix} \cos(k-1)\theta_2 & -\sin(k-1)\theta_2 \\ \sin(k-1)\theta_2 & \cos(k-1)\theta_2 \end{pmatrix} \begin{pmatrix} Q_{l,x} \\ Q_{l,y} \end{pmatrix} \quad (8)$$

By using Formula (8), the x and y coordinates of the k-th spiral curve $Q_k$ can be expressed as Formula (9).

$$Q_{k,x} = Q_{l,x} \cos(k-1)\theta_2 - Q_{l,y} \sin(k-1)\theta_2$$
$$Q_{k,y} = Q_{l,x} \sin(k-1)\theta_2 + Q_{l,y} \cos(k-1)\theta_2 \quad (9)$$

Spiral curves in a spiral lens disc can be formed along tracks obtained from ° Formula (9). Based on a formula for the spiral curves, cross-sections of the spiral lens disc have the same shape with the radius of curvature $r_{arc}$. The spiral lens disc is not particularly restricted in size. In addition, the distance d between two adjacent spiral curves is calculated using Formula (6). Consequently, the entire shape of the spiral lens disc can be designed. Here, an inside diameter of the spiral lens disc needs to be greater than the diameter 2r of a reel, i.e., the central circle 71, but an outside diameter thereof is not restricted. As described above, the spiral lens disc, according to an aspect of the present invention, is fabricated to have spiral curves, which satisfy the condition that when a plurality of normal lines are drawn with respect to an arbitrary tangent line of the central circle 71 at intervals of the same distance, the tangential vectors of the intersections (i.e., the virtual points $P_1$, $P_2$, $P_3$, or $P_4$ shown in FIG. 6C) between the tangent line and the normal lines are the same. Because the distance d is the same as a distance between two adjacent cylindrical lens cells in the spiral lens disc and the tangential vectors with respect to the virtual points $P_1$, $P_2$, $P_3$, or $P_4$ are the same, the shapes of each cylindrical lens cell have the same curvature.

The spiral curves in the spiral lens disc can be formed along the tracks obtained from Formula (9). Based on a formula for the spiral curves, cross-sections of the spiral lens disc have the same shape with the radius of curvature $r_{arc}$. The spiral lens disc is not particularly restricted in size. In addition, the distance d between two adjacent spiral curves is calculated using Formula (6). Consequently, the entire shape of the spiral lens disc can be designed. Here, an inside diameter of the spiral lens disc needs to be greater than the diameter 2r of a reel, i.e., the central circle 71, but an outside diameter thereof is not restricted. As described above, the spiral lens disc, according to an aspect of the present invention, is fabricated to have the spiral curves, which satisfy the condition that when a plurality of normal lines are drawn with respect to an arbitrary tangent line of the central circle 71, at intervals of the same distance, the tangential vectors of the intersections (i.e., the virtual points $P_1$, $P_2$, $P_3$, or $P_4$ shown in FIG. 6C) between the tangent line and the normal lines are the same. Because the distance d is the same as a distance between two adjacent cylindrical lens cells in the spiral lens disc and the tangential vectors with respect to the virtual points $P_1$, $P_2$, $P_3$, or $P_4$ are the same, the shapes of each cylindrical lens cell have the same curvature.

The number of cylindrical lens cells 77 in the spiral lens disc 70 can be adjusted to achieve synchronization with an operating frequency of the light valve. In other words, when the operating frequency of the light valve is fast, a large number of cylindrical lens cells 77 are provided so that a scrolling speed can be increased while the rotational speed of the spiral lens disc 70 is fixed.

Alternatively, in order to achieve the synchronization with the operating frequency of the light valve, the rotational frequency of the spiral lens disc 70 can be increased while the number of cylindrical lens cells 77 is fixed. For example, when the operating frequency of the light valve is 960 Hz, that is, the light valve operates at a speed of 1/960 second per frame and reproduces 960 frames per second, the spiral lens disc 70 can be structured as follows.

The spiral lens disc 70 has the outmost circumference with a diameter of 140 mm, the inmost circumference with a diameter of 60 mm, and 32 cylindrical lens cells with a width of 5.0 mm and a radius of curvature of 24.9 mm. When it is assumed that 32 frames are reproduced when the spiral lens disc 70 rotates one time, the spiral lens disc 70 is rotated 30 times per second in order to reproduce 960 frames per second. In this case, the spiral lens disc 70, is rotated 1800 times during 60 seconds, i.e., at a rotational speed of 1800 rpm. In addition, when the operating frequency of the light valve is increased by 50% to reach 1440 Hz, the spiral lens disc 70 is rotated at a speed of 2700 rpm in order to be synchronized with the operating frequency of the light valve.

The scrolling action of the first and second spiral lens disc 103a and 103b will be described with reference to FIG. 2.

Referring to FIG. 2, the single white light SL radiated from the first and second light sources 101a and 101b is converted into the multi light ML by the cylindrical lens cells. 77 of the first and second spiral lens discs 103a and 103b, and is then incident on the first and second dichroic filter arrays 105a and 105b. Each of the first and second dichroic filter arrays 105a and 105b includes a plurality of dichroic filters depending on the number of color light beams to be separated, and the plurality of dichroic filters are arranged in parallel.

The light output from the first and second spiral lens discs 103a and 103b is incident on the first and second dichroic filter arrays 105a and 105b as converging light beams, which have different incident angles depending on wavelength bands, and are reflected at different positions by the plurality of dichroic filters. The plurality of color light beams output from the first and second dichroic filter arrays 105a and 105b are transmitted in a one-to-one correspondence to the first and second splitters 111a and 111b by the first and second fly-eye lenses 107a and 107b and pass through the first and second relay lenses 109a and 109b to be focused on the first and second light valves 113a and 113b.

The lens cells of each of the first and second spiral lens discs 103a and 103b match one-to-one with the lens cells of each of the first and second fly-eye lenses 107a and 107b. A condenser lens can be disposed in front or back of each of the first and second relay lenses 109a and 109b. The color light beams transmitted in the one-to-one correspondence by the first and second fly-eye lenses 107a and 107b are overlappingly focused on the first and second light valves 113a and 113b via the first and second relay lenses 109a and 109b, thereby forming color bars 113a and 113b'. As the first and second spiral lens discs 103a and 103b are rotated at a predetermined speed, the color bars 113a' and 113b' are scrolled on the first and second light valves 113a and 113b, respectively.

Figure 7:
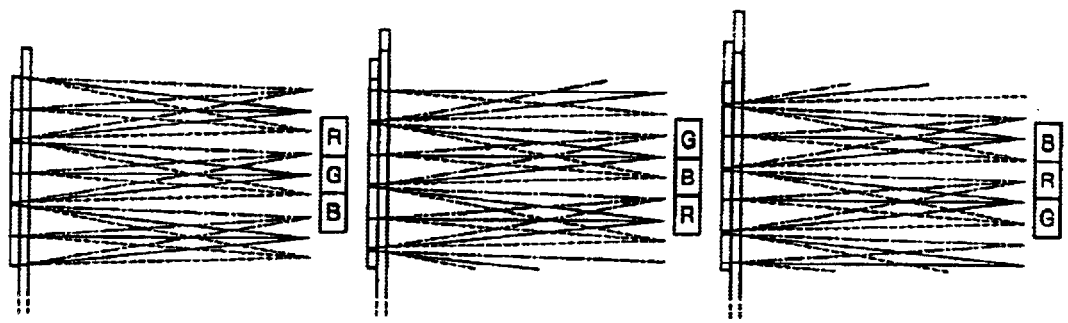
FIG. 7 is a diagram illustrating a scrolling principle of the spiral lens disc.

FIG. 7 is a schematic diagram illustrating the principle In that one of the color bars 113a' or 113b' is scrolled as the spiral lens disc is rotated in the projection systems, according to first through fourth aspects of the present invention. Referring to FIG. 7, as the spiral lens disc rotates at a predetermined speed, a lower lens cell and an upper lens cell of the spiral lens disc move up and down, respectively, at a predetermined speed. The optical path of light that has passed through the spiral lens disc continuously changes as the upper and lower lens cells of the spiral lens disc are moved, and, thus, a focused position on the light valve also changes. Consequently, as shown in FIG. 7, the color bar is scrolled so that an order of the color bars RGB changes into GBR and then into BRG.

When forming the single image on the single screen S using the first and second illumination optical systems 100a and 100b in the projection system, according to the first aspect of the present invention, the image projected onto the screen S by the first and second illumination optical systems 100a and 100b can be rendered to have two times higher brightness and sharpness than the image formed in a conventional projection system by matching a cycle of power supply to the first and second light sources 101a and 101b, a rotational speed of the first and second spiral lens discs 103a and 103b, and the image signal applied to the first and second light valves 113a and 113b.

In addition, at least one of the first and second dichroic filter arrays 105a and 105b can be provided with dichroic filters to divide an incident light into yellow, cyan, and magenta (YCM) instead of the red, green and blue (RGB), in order to improve a color balance and expand a color gamut. It is apparent that other optical devices than the dichroic filter array can be used as the spectroscope and the plurality of colors of light beams can be variously set. The plurality of colors can be set to primary colors, such as R, G, and B or complementary colors such as Y, C, and M.

Figure 3:
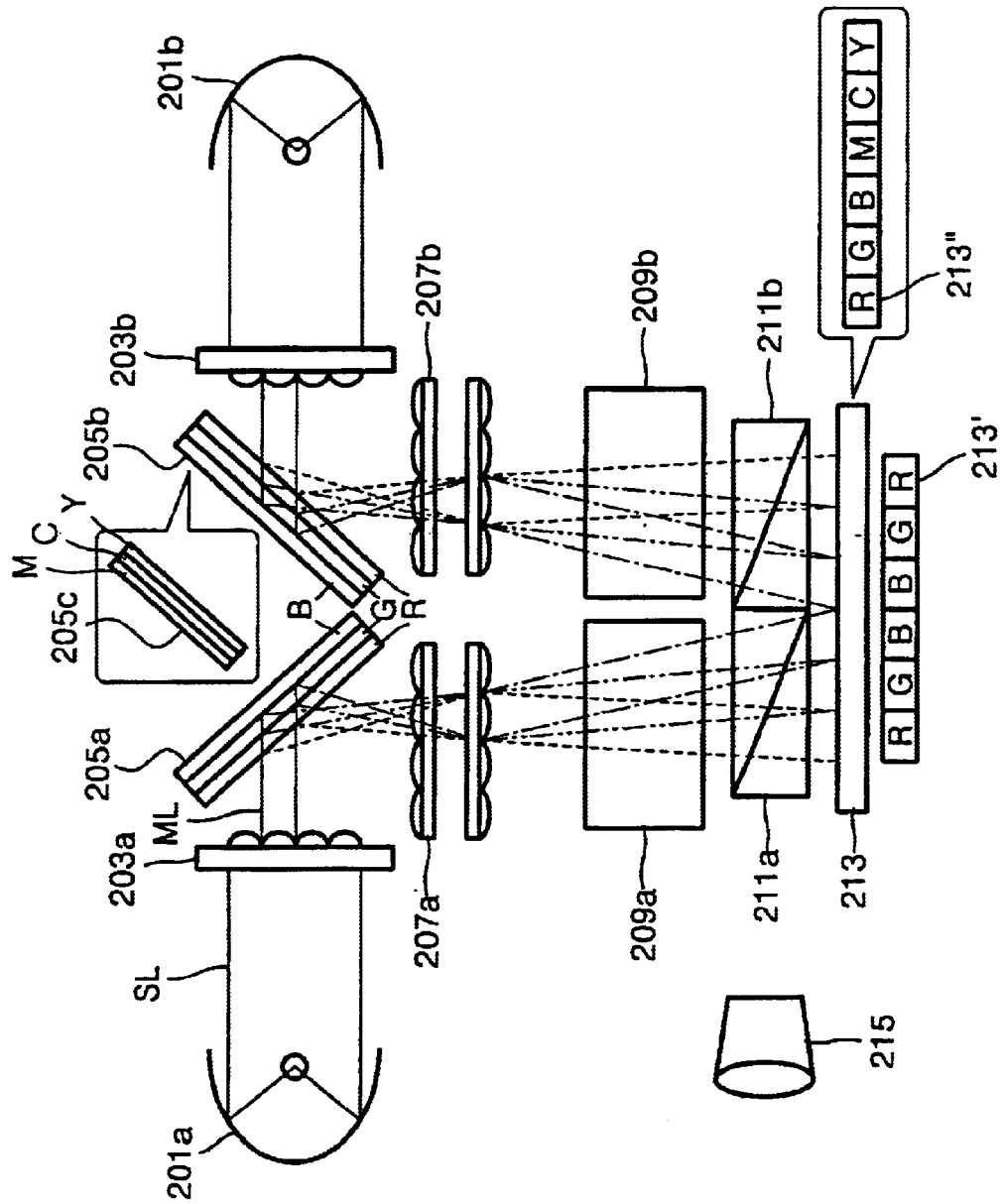
FIG. 3 is a diagram of the projection system, according to a second aspect of the, present invention.

FIG. 3 is a diagram of the projection system, according to the second aspect of the present invention. Referring to FIG. 3, the projection system includes first and second light sources 201a and 201b, which radiate the single white light SL in parallel and in opposite: directions facing each other. The projection system also includes first and second spiral lens discs 203 and 203b, which convert the single white light SL incident from the first and second light sources 201a and 201b into the multi white light ML to scroll the light, first and second dichroic filter arrays 205a and 205b, which separate the multi white light ML incident from the first and second spiral lens discs 203 and 203b into a plurality of RGB light beams, and first and second fly-eye lenses 207a and 207b, which transmit the plurality of RGB light beams from the first and second dichroic filter arrays 205a and 205b to a light valve 213 in one-to-one correspondence. Further, first and second relay lenses 209a and 209b in the projection system focus the plurality of RGB light beams passing through the first and second fly-eye lenses 207a and 207b on the light valve 213.

In addition, the projection system, according to the second aspect of the present invention, includes the light valve 213, which modulates the focused RGB light beams in accordance with a video signal to form the image, first and second beam splitters 211a and 211b, which are disposed on the optical paths between the respective first and second relay lenses 209a and 209b and the light valve 213, and a projection lens 215, which projects the modulated light beams onto a screen (not shown) to display the image. The first and second beam splitters 211a and 211b direct the RGB light beams, which have passed through the first and second relay lenses 209a and 209b, to the light valve 213 and direct the light output from the light valve 213 to the projection lens 215.

The structure and functions of an optical device including the first and second spiral lens discs 203a and 203b in the projection system, according to the second aspect of the present invention, are the same as those in the projection system, according to the first aspect of the present invention, with an exception that the projection system, according to the second aspect of the present invention, includes only one light valve. Because the projection system, according to the second aspect of the present invention also includes two light sources, it is expected to have two times higher brightness than the conventional projection system including a single light source.

When the dichroic filters to separate the incident light into the RGB light beams are provided, a color bar 213 is formed on the light valve 213. Alternatively, when the second dichroic filter array 205b is replaced by a dichroic filter array 205c, which separates the incident light into the YCM light beams, a color bar 213" is formed. By changing the second dichroic filter array 205b, the image giving various color senses can be expressed. Consequently, a color balance can be improved and the color gamut can be expanded.

In order to display the single image on the single screen using the projection system, according to the second aspect of the present invention, the following may be matched; a cycle of power supply to the first and second light sources 201a and 201b, the rotational speed of the first and second spiral lens discs 203a and 203b, and the image signal applied to the light valve 213.

Figure 4:
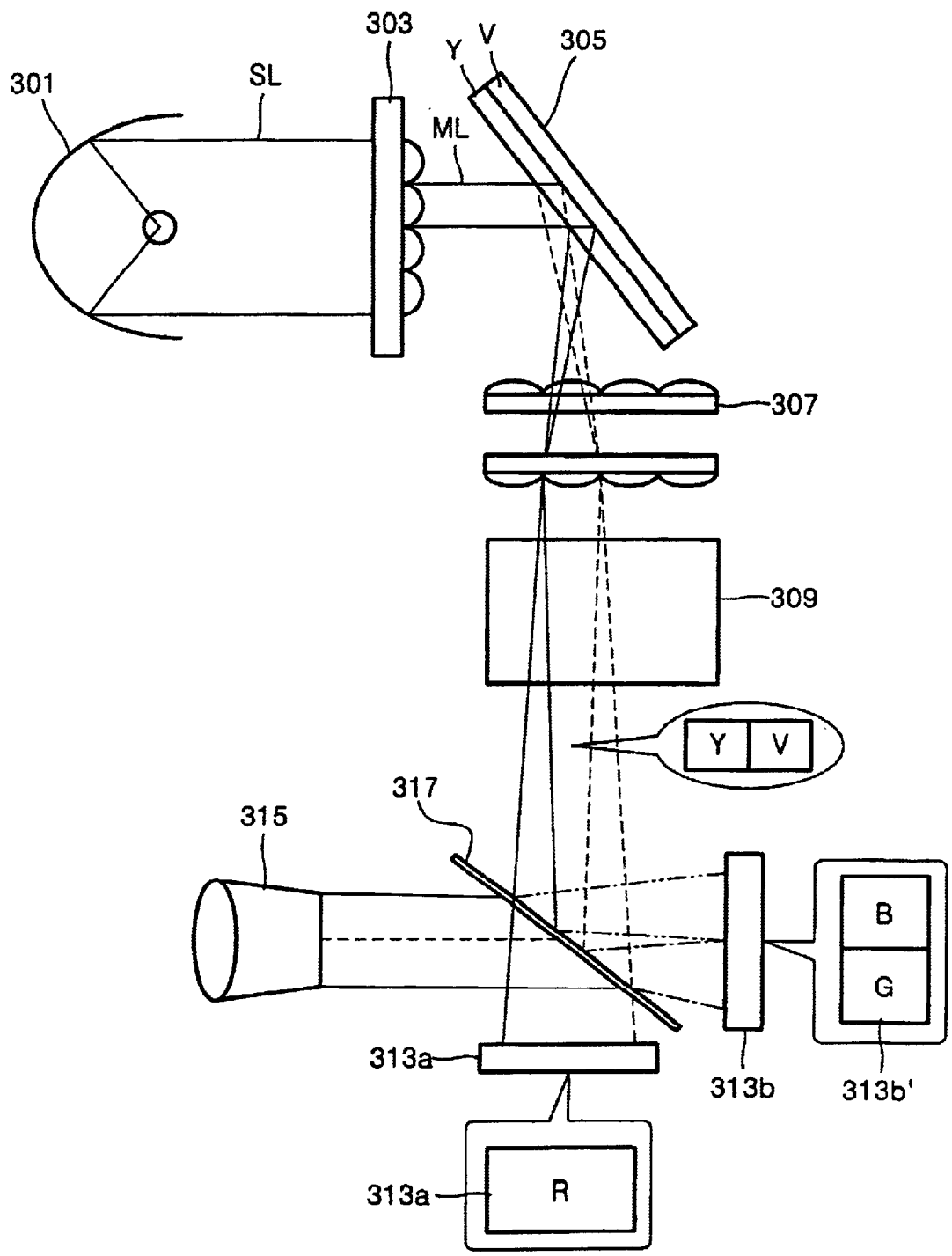
FIG. 4 is a diagram of the projection system, according to a third aspect of the present invention.

FIG. 4 is a diagram of a projection system, according to the third aspect of the present invention. Referring to FIG. 4, the projection system, according to the third aspect of the present invention includes a light source 301, which radiates the single white light SL, a spiral lens disc 303, which converts the single white light SL incident from the light source 301 into the multi white light ML to scroll the light, a dichroic filter array 305, which separates the multi white light ML incident from the spiral lens disc 303 into a plurality of yellow and violet (YV) light beams, and a fly-eye lens 307, which transmits the plurality of YV light beams from the dichroic filter array 305 to first and second light valves 313a and 313b in one-to-one correspondence. A relay lens 309 in the projection system focuses the plurality of YV light beams, which have passed through the fly-eye lens 307, on the first and second light valves 313a and 313b. A color splitting filter 317 splits the plurality of YV light beams passed through the relay lens 309 into different optical paths depending on a wavelength. The first and second light valves 313a and 313b modulate color light beams incident from the color splitting filter 317 according to the image signal to form an image. A projection lens 315 in the projection system projects the light, which has been modulated and then has passed through the color splitting filter 317, onto the screen (not shown) to form the image.

The color splitting filter 317 separates the incident light into the primary color (RGB) light beams so that a color bar 313a', in which a single color R is expressed in a single segment, is formed on the first light valve 313a and a color bar 313b', in which two colors G and B are respectively expressed in two segments, is formed on the second light valve 313b. The positions of the color of the color bars 313a and 313b on the respective first and second light valves 313a and 313b can be changed in accordance with the rotation of the spiral lens disc 303, but the numbers of segments in the color bars 313a and 313b are respectively fixed to one and two. In addition, the dichroic filters included in the dichroic filter array 305 can be changed to separate the light into other colors other than Y and V, so that various color bars are formed.

The structure and functions of an optical device including the spiral lens disc 303 in the projection system, according to the third aspect of the present invention, are the same as those in the projection system, according to the first aspect of the present invention, with the exception that the projection system, according to the third aspect includes only one light source and, thus, includes only one spiral lens disc, one dichroic filter array, one fly-eye lens, and one relay lens. Because the projection system, according to the third aspect of the present invention also includes two light valves 313a and 313b, it is expected to realize an improved color balance and an expanded color gamut compared to the conventional projection system including a single light source.

In order to display the single image on the single screen using the projection system, according to the third aspect of the present invention, it is required to match a cycle of power supply to the light source 301, the rotational speed of the spiral lens disc 303, and the image signal applied to the first and second light valves 313a and 313b.

FIG. 5 is a diagram of the projection system, according to the fourth aspect of the present invention. Referring to FIG. 5, the projection system, according to the fourth aspect of the present invention includes a light source 401, which radiates single white light SL, and a color splitting filter 417, which splits the single white light SL incident from the light source 401 into a first color light beam L1, for example, an R light beam, and a second color light beam L2 so as to direct the first color light beam L1 to a first light valve 413a and the second color light beam L2 to a second light valve 413b. A spiral lens disc 403 in the projection system is disposed on the optical path of the second color light beam L2 and converts the second color light beam L2, i.e., the single light, into the multi light to scroll the light. A dichroic filter array 405 in the projection system separates the multi light incident from the spiral lens disc 403 into the plurality of color light beams, for example, the GB light beams.

In addition, the projection system, according to the fourth aspect includes a fly-eye lens 407, which transmits the GB light beams from the dichroic filter array 405 to the second light valve 413b, and a first relay lens L1, which focuses the first light beam L1 output from the color splitting filter 417 on the first light valve 413a, A second relay lens 409b in the projection system focuses the GB light beams that pass through the fly-eye lens 407, on the second light valve 413b. The first and second light valves 413a and 413b modulate the light beams that pass through the first and second relay lenses 409a and 409b in accordance with an image signal to form an image, and a projection lens 415 projects the modulated light on the screen (not shown).

The color splitting filter 417 separates the incident light into the primary colors (RGB) so that a color bar 413a', in which the single color R is expressed in a single segment, is formed on the first light valve 413a. Further, a color bar 413b', in which two colors G and B are respectively expressed in two segments, is formed on the second light valve 413b. The position of the color bar 413b' on the second light valve 413b can be changed in accordance with the rotation of the spiral lens disc 403, but the numbers of segments in the color bars 413a' and 413b' are respectively fixed to one and two. In addition, the dichroic filters included in the dichroic filter array 405 can be changed to separate the light into other colors other than B and G so that the various color bars are formed.

The structure and functions of the optical device including the spiral lens disc 403 in the projection system, according to the fourth aspect of the present invention, are the same as those in the projection system according to the first aspect of the present invention, with the exception that the projection system, according to the fourth aspect, includes only one light source and splits the optical path using the color splitting filter and, thus, includes only one spiral lens disc, one dichroic filter array, and one fly-eye lens. Because the projection system, according to the fourth aspect also includes two light valves, it is expected to realize an improved color balance and an expanded color gamut compared to the conventional projection system including a single light source.

In order to display the single image on the single screen using the projection system according to the fourth aspect the cycle of power supply to the light source 401, the rotational speed of the spiral lens disc 403, and an image signal applied to the first and second light valves 413a and 413b may be matched.

Because the structure of a projection optical system including the projection lens in the projection systems, according to the first through fourth aspects of the present invention, can be variously changed based on the conventional technology, a detailed description thereof is omitted.

According to the present invention, a projection system including an illumination: optical system employing a spiral lens disc employs two light sources or two light valves, thereby improving a light emission efficiency and color balance of an image displayed on a screen and expanding a color gamut.

Although a few aspects of the present invention have been shown and described, it would be appreciated by those skilled in the art that changes may be made in this aspect without departing from the principles and spirit of the invention, the scope of which is defined in the claims and their equivalents.

What is claimed is:

1. A projection system to display an image on a screen, comprising:
   first and second light sources, separated by a predetermined distance from each other and radiating a single white light in parallel and in the same direction;
   first and second spiral lens discs comprising cylindrical lens cells arranged in a spiral shape and separating the single white light incident from the first and second light sources into a multi white light by converting a rotational motion of the cylindrical lens cells into a rectilinear movement of a cylindrical lens array;

first and second spectroscopes separating the multi white light incident from the first and second spiral lens discs into color light beams having different wavelength bands;

first and second light valves modulating the color light beams incident from the first and second spectroscopes according to an image signal to form the image; and first and second projection lenses projecting the color light beams modulated by the first and second light valves onto the screen to display the image.

2. The projection system of claim 1, further comprising:
a first fly-eye lens on a first optical path between the first spectroscope and the first light valve; and
a second fly-eye lens on a second optical path between the second spectroscope and the second light valve.

3. The projection system of claim 2, further comprising:
a first relay lens on a third optical path between the first fly-eye lens and the first light valve; and
a second relay lens on a fourth optical path between the second fly-eye lens and the second light valve, wherein the first and second relay lenses focus the incident light onto the first and second light valves, respectively.

4. The projection system of claim 3, further comprising:
a first beam splitter disposed on a fifth optical path between the first relay lens and the first light valve, transmitting the light incident from the first relay lens to the first light valve, and reflecting the light incident from the first light valve to the first projection lens; and
a second beam splitter disposed on a sixth optical path between the second relay lens and the second light valve, transmitting the light incident from the second relay lens to the second light valve, and reflecting the light incident from the second light valve to the second projection lens.

5. The projection system of claim 1 wherein the first and second spectroscopes are dichroic filter arrays separating the incident light into the color light beams.

6. The projection system of claim 2, wherein the first and second spectroscopes are dichroic filter arrays, separating the incident light into the plurality of color light beams.

7. The projection system of claim 5, wherein at least one of the dichroic filter arrays comprises dichroic filters to separate the incident light into red, green, and blue light beams.

8. The projection system of claim 5, wherein at least one of the dichroic filter arrays comprises dichroic filters to separate the incident light into yellow, cyan, and magenta light beams.

9. The projection system of claim 7, wherein a color bar in which three colors comprise three segments, is formed on each of the first and second light valves.

10. The projection system of claim 8, wherein a color bar in which three colors comprise three segments, is formed on each of the first and second light valves.

11. A projection system to display an image on a screen, comprising:
first and second light sources separated by a predetermined distance from each other and radiating a single white light in parallel and in opposite directions facing each other;
first and second spiral lens discs comprising cylindrical lens cells arranged in a spiral shape and separating the single white light incident from the first and second light sources into a multi light by converting a rotational motion of the cylindrical lens cells into a rectilinear movement of a cylindrical lens array;

first and second spectroscopes separating the multi white light incident from the first and second spiral lens discs into color light beams having different wavelengths;

a light valve modulating the color light beams incident from the first and second spectroscopes according to an image signal to form the image; and a projection lens, projecting the color light beams modulated by the light valve onto the screen to display the image.

12. The projection system of claim 11, further comprising:
a first fly-eye lens on a first optical path between the first spectroscope and the light valve; and
a second fly-eye lens on a second optical path between the second spectroscope and the light valve.

13. The projection system of claim 12, further comprising:
a first relay lens on a third optical path between the first fly-eye lens and the light valve; and
a second relay lens on a fourth optical path between the second fly-eye lens and the light valve, wherein the first and second relay lenses focus the incident light onto the light valve.

14. The projection system of claim 13, further comprising:
a first beam splitter disposed on a fifth optical path between the first relay lens and the light valve, transmitting the light incident from the first relay lens to the light valve, and reflecting the light incident from the light valve to the projection lens; and
a second beam splitter, disposed on a sixth optical path between the second relay lens and the light valve, transmitting the light incident from the second relay lens to the light valve, and reflecting the light incident from the light valve to the projection lens.

15. The projection system of claim 11, wherein the first and second spectroscopes are dichroic filter arrays, to separate the incident light into the color light beams.

16. The projection system of claim 12, wherein the first and second spectroscopes are dichroic filter arrays to separate the incident light into the color light beams.

17. The projection system of claim 13, wherein at least one of the dichroic filter arrays comprises a dichroic filter to separate the incident light into red, green, and blue light beams.

18. The projection system of claim 14, wherein at least one of the dichroic filter arrays comprises dichroic filters for separating the incident light into red, green, and blue light beams.

19. The projection system of claim 15, wherein at least one of the dichroic filter arrays comprising dichroic filters to separate the incident light into yellow, cyan, and magenta light beams.

20. The projection system of claim 16, wherein at least one of the dichroic filter arrays comprises dichroic filters to separate the incident light into yellow, cyan, and magenta light beams.

21. The projection system of claim 17, wherein a color bar in which three colors comprise three segments, is formed on the light valve.

22. The projection system of claim 18, wherein a color bar in which three colors comprise three segments, is formed on the light valve.

23. The projection system of claim 19, wherein a color bar in which three colors comprise three segments, is formed on the light valve.

24. The projection system of claim 20, wherein a color bar in which three colors comprise three segments, is formed on the light valve.

25. A projection system to display an image on a screen, comprising:

a light source radiating a single white light;

a spiral lens disc comprising cylindrical lens cells arranged in a spiral shape and separating the single white light incident from the light source into a multi light by converting a rotational motion of the cylindrical lens cells into a rectilinear movement of a cylindrical lens array;

a spectroscope separating the multi light incident from the spiral lens disc into color light beams having different wavelengths;

a color splitting filter splitting the color light beams incident from the spiral lens disc into two optical paths depending on the wavelengths;

first and second light valves modulating the color light beams, incident via two optical paths, according to an image signal to form the image; and a projection lens projecting the color light beams modulated by the first and second light valves onto the screen to display the image.

26. The projection system of claim 25, further comprising:

a fly-eye lens on a first optical path between the spectroscope and the color splitting filter.

27. The projection system of claim 26, further comprising:

a relay lens on a second optical path between the fly-eye lens and the color splitting filter to focus the incident light onto the light valve.

28. The projection system of claim 25, wherein the spectroscope is a dichroic filter array to separate the incident light into the color light beams.

29. The projection system of claim 26, wherein the spectroscope is a dichroic filter array to separate the incident light into the color light beams.

30. The projection system of claim 28, wherein the dichroic filter array comprises dichroic filters to separate the incident light into yellow and violet light beams.

31. The projection system of claim 29, wherein the dichroic filter array comprises dichroic filters to separate the incident light into yellow and violet light beams.

32. The projection system of claim 25, wherein a color bar, in which one color is one segment, is formed on the first light valve, and a color bar, in which two colors are two segments, respectively, is formed on the second light valve.

33. A projection system to display an image on a screen, comprising:

a light source radiating a single white light;

a color splitting filter splitting the single white light incident from the light source into two optical paths depending on wavelength bands;

a spiral lens disc disposed on one of the two optical paths, and comprising cylindrical lens cells arranged in a spiral shape, and separating the light incident from the color splitting filter into a multi light by converting a rotational motion of the cylindrical lens cells into a rectilinear movement of a cylindrical lens array;

a spectroscope separating the multi light incident from the spiral lens disc into color light beams having different wavelengths;

first and second light valves modulating the light, incident via two optical paths, according to an image signal in order to form the image; and a projection lens, projecting the color light beams modulated by the first and second light valves onto the screen to display the image.

34. The projection system of claim 33, further comprising:

a fly-eye lens on a first optical path between the spectroscope and the second light valve.

35. The projection system of claim 34, further comprising:

a relay lens on a second optical path between the color splitting filter and the light valve to focus the light on the light valve.

36. The projection system of claim 33, wherein the spectroscope is a dichroic filter array to separate the incident light into the color light beams.

37. The projection system of claim 35, wherein the spectroscope is a dichroic filter array to separate the incident light into the color light beams.

38. The projection system of claim 33, wherein the dichroic filter array comprises dichroic filters to separate the incident light into yellow and violet light beams.

39. The projection system of claim 33, wherein a color bar, in which one color is one segment, is formed on the first light valve, and a color bar, in which two colors are two segments, respectively, is formed on the second light valve.

40. The projection system of claim 33, wherein the spiral lens disc comprises the spiral shape using an involute function.

41. The projection system of claim 25, wherein the spiral lens disc comprises spiral curves where a plurality of normal lines are drawn with respect to an arbitrary tangent line of a central circle of the spiral lens at intervals of a same distance, and tangential vectors of the intersections between the tangent line and the normal lines are the same.

42. The projection system of claim 25, wherein as the spiral lens disc rotates at a predetermined speed, a lower lens cell and an upper lens cell of the spiral lens disc move up and down, respectively, at a predetermined speed.

43. The projection system of claim 42, wherein an optical path of light passing through the spiral lens disc continuously changes as the upper and lower lens cells of the spiral lens disc move, and a focused position on the light valve changes.

44. The projection system of claim 39, wherein the color bar is scrolled so that an order of the color bars RGB changes into GBR and then into BRG.

* * * * *

UNITED STATES PATENT AND TRADEMARK OFFICE
CERTIFICATE OF CORRECTION

PATENT NO. : 6,814,450 B2
DATED : November 9, 2004
INVENTOR(S) : Tae-hee Kim

It is certified that error appears in the above-identified patent and that said Letters Patent is hereby corrected as shown below:

Title page,
Item [73], Assignee, change "Suwon-Si" to -- Suwon-si --.

Column 13,
Line 39, insert -- , -- after "claim 1".

Signed and Sealed this

Third Day of May, 2005

JON W. DUDAS
*Director of the United States Patent and Trademark Office*